United States Patent
Hu

(10) Patent No.: US 12,452,099 B2
(45) Date of Patent: Oct. 21, 2025

(54) I/O DEVICE ACCESS METHOD AND APPARATUS

(71) Applicant: SHENZHEN YINWANG INTELLIGENT TECHNOLOGIES CO., LTD., Shenzhen (CN)

(72) Inventor: Tao Hu, Shenzhen (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/320,597

(22) Filed: May 19, 2023

(65) Prior Publication Data

US 2023/0291604 A1 Sep. 14, 2023

Related U.S. Application Data

(63) Continuation of application No. PCT/CN2020/130639, filed on Nov. 20, 2020.

(51) Int. Cl.
*G06F 13/10* (2006.01)
*H04L 12/40* (2006.01)

(52) U.S. Cl.
CPC .. *H04L 12/40032* (2013.01); *H04L 12/40013* (2013.01); *H04L 12/40078* (2013.01)

(58) Field of Classification Search
CPC ......... H06L 12/40032; H06L 12/40013; H06L 12/40078
See application file for complete search history.

(56) References Cited

U.S. PATENT DOCUMENTS

| | | | | |
|---|---|---|---|---|
| 6,055,493 | A * | 4/2000 | Ries | H04L 41/5032 709/224 |
| 6,236,910 | B1 * | 5/2001 | Iwai | G06F 9/44 123/480 |
| 6,847,886 | B2 * | 1/2005 | Demir | G09B 29/106 701/461 |
| 7,013,250 | B2 * | 3/2006 | Hagiwara | G05B 17/02 703/22 |
| 7,188,016 | B2 * | 3/2007 | Flores | B60R 16/0231 701/59 |
| 7,257,522 | B2 * | 8/2007 | Hagiwara | G01M 13/02 477/110 |

(Continued)

FOREIGN PATENT DOCUMENTS

| | | |
|---|---|---|
| CN | 1890639 A | 1/2007 |
| CN | 101634833 A | 1/2010 |

(Continued)

*Primary Examiner* — Cheng Yuan Tseng
(74) *Attorney, Agent, or Firm* — Conley Rose, P.C.

(57) ABSTRACT

An input/output (I/O) device access method includes a first centralized controller that performs object-oriented modeling on various I/O devices in a vehicle to generate standard models of the various I/O devices, and generate a mapping configuration file between the various I/O devices and the standard models. The first centralized controller further generates a resource access request based on an access operation of a user, where the resource access request includes a first standard model of a first I/O device accessed by the user. The first centralized controller further sends the resource access request to the first I/O device based on the mapping configuration file.

20 Claims, 7 Drawing Sheets

(56) References Cited

U.S. PATENT DOCUMENTS

| | | | |
|---|---|---|---|
| 7,657,404 B2* | 2/2010 | Thurner | G06Q 10/06 |
| | | | 703/7 |
| 8,649,939 B2* | 2/2014 | Yoshimura | G06F 9/52 |
| | | | 701/36 |
| 11,059,435 B2* | 7/2021 | Im | G06F 9/4411 |
| 11,834,068 B2* | 12/2023 | Watanabe | B60W 60/0015 |
| 2001/0041956 A1 | 11/2001 | Wong et al. | |
| 2009/0241130 A1* | 9/2009 | Su | G06F 9/45558 |
| | | | 719/324 |
| 2010/0287563 A1* | 11/2010 | Kishita | B60W 50/0098 |
| | | | 719/313 |
| 2012/0297379 A1 | 11/2012 | Anderson et al. | |
| 2016/0318522 A1* | 11/2016 | Tanaka | H04L 12/40091 |
| 2017/0161967 A1* | 6/2017 | Matsuo | G07C 5/00 |
| 2018/0018415 A1* | 1/2018 | Pulfer | G06Q 10/0635 |
| 2019/0079717 A1* | 3/2019 | Lee | G06F 3/0488 |
| 2021/0099848 A1* | 4/2021 | Ruan | H04W 84/042 |
| 2022/0292047 A1* | 9/2022 | Oergele | H04L 12/40 |

FOREIGN PATENT DOCUMENTS

| | | |
|---|---|---|
| CN | 102136933 A | 7/2011 |
| CN | 102576307 A | 7/2012 |
| CN | 103150152 A | 6/2013 |
| CN | 103620615 A | 3/2014 |
| CN | 105610904 A | 5/2016 |
| CN | 107229584 A | 10/2017 |
| CN | 108770016 A | 11/2018 |
| CN | 109213143 A | 1/2019 |
| CN | 109474912 A | 3/2019 |
| CN | 111787049 A | 10/2020 |
| CN | 111949037 A | 11/2020 |
| JP | 2002331882 A | 11/2002 |
| JP | 2006270878 A | 10/2006 |
| JP | 2012068207 A | 4/2012 |
| JP | 2020179802 A | 11/2020 |

* cited by examiner

I/O DEVICE ACCESS METHOD AND APPARATUS

CROSS-REFERENCE TO RELATED APPLICATIONS

This is a continuation of International Patent Application No. PCT/CN2020/130639 filed on Nov. 20, 2020, which is hereby incorporated by reference in its entirety.

TECHNICAL FIELD

This disclosure relates to the field of communications technologies, and in particular, to an input/output (I/O) device access method and apparatus.

BACKGROUND

With development of intelligent vehicles and new energy vehicles, automotive electrical and electronic architectures evolve from distribution to centralization, and controllers tend to be centralized. Vehicles usually have dozens or even hundreds of controllers and hundreds of I/O devices with I/O interfaces. These I/O devices may be various sensors such as a temperature sensor or a humidity sensor, or may be various actuators such as a motor. These I/O devices have a plurality of types of interfaces, such as a Controller Area Network (CAN) interface, a Local Interconnect Network (LIN) interface, a pulse-width modulation (PWM) interface, an H-bridge (or H-bridge bus (HB)) interface, an analog-to-digital (AD) conversion interface, a digital input (DI) interface, and a digital output (DO) interface. When various I/O devices are accessed by a centralized controller, flexibility and reliability are relatively poor.

SUMMARY

Embodiments of this disclosure provide an I/O device access method and apparatus, to resolve a technical problem that flexibility and reliability are relatively poor when different types of I/O devices are accessed by a centralized controller.

According to a first aspect, an embodiment of this disclosure provides an I/O device access method, and the method may include the following.

A first centralized controller performs object-oriented modeling on various I/O devices in a vehicle, to generate standard models of the various I/O devices, and generate a mapping configuration file between the various I/O devices and the standard models.

The first centralized controller generates a resource access request based on an access operation of a user, where the resource access request includes a first standard model of a first I/O device accessed by the user.

The first centralized controller sends the resource access request to the first I/O device based on the mapping configuration file.

Object-oriented modeling is performed on the various I/O devices, so that a single standard model can be mapped to a plurality of I/O devices with different model numbers or different interfaces. In addition, when accessing an I/O device, a centralized controller can send a resource access request for a standard model corresponding to the I/O device, can accurately send the resource access request to the I/O device based on the mapping configuration file to complete access to the I/O device, and does not need to perform adjustment based on different vendors, vehicle models, device model numbers, or interface types. Therefore, flexibility and reliability of accessing the I/O device are greatly improved.

In a possible implementation, that a first centralized controller performs object-oriented modeling on various I/O devices in a vehicle, to generate standard models of the various I/O devices, and generate a mapping configuration file between the various I/O devices and the standard models includes the following.

The first centralized controller performs object-oriented modeling on the various I/O devices in the vehicle for an application based on types of the various I/O devices accessed by the application, to generate the standard models of the various I/O devices.

The first centralized controller performs physical port modeling for the I/O devices based on physical ports of the various I/O devices, and configures a conversion relationship between standardized data used to control the standard model and control data used to control the I/O device.

Upward modeling enables the application to access the I/O devices by accessing the standard models. Downward modeling enables the I/O devices with different interfaces to be mapped to a same physical port, and access to the I/O devices with different types of interfaces can be implemented through the physical port. When the I/O devices with different types of interfaces are accessed, corresponding conversion is performed on standardized data corresponding to a standard model and control data corresponding to a control device. An effect of shielding a type of a physical port of an I/O device can be implemented, and an upper-layer application can be kept unchanged during development of different vehicle models. This reduces a development difficulty, improves a reuse degree of application-layer software, and facilitates vehicle research and development and testing. In addition, when a vendor, a vehicle model, a model number, or an interface changes, only configuration data needs to be updated. This is convenient for upgrade.

In a possible implementation, the resource access request further includes first standardized data used to control the first standard model, and the method further includes the following.

The first centralized controller converts, based on the conversion relationship, the first standardized data into first control data corresponding to the first I/O device.

The first centralized controller sends the first control data to the first I/O device.

Data conversion is performed. When I/O devices of different vendors, in vehicles with different vehicle models, or with different model numbers or different interfaces are accessed, only a conversion relationship between data needs to be adaptively configured.

In a possible implementation, the method further includes the following.

The first centralized controller receives sampled data reported by the first I/O device.

The first centralized controller converts, based on the conversion relationship, the sampled data into second standardized data corresponding to the first standard model.

In a possible implementation, when the first centralized controller needs to access a second I/O device controlled by a second centralized controller, the resource access request includes a second standard model of the second I/O device accessed by the user, and the method further includes the following.

The first centralized controller sends the resource access request to the second I/O device through a communication-layer link between the first centralized controller and the second centralized controller.

In this cross-node access manner, an application layer of the second centralized controller does not need to be modified, and a new communications interface does not need to be added. This improves cross-node access efficiency and reduces cross-node access costs.

According to a second aspect, an embodiment of this disclosure provides an I/O device access apparatus, and the apparatus may include a processing unit configured to perform object-oriented modeling on various I/O devices in a vehicle, to generate standard models of the various I/O devices, and generate a mapping configuration file between the various I/O devices and the standard models, and generate a resource access request based on an access operation of a user, where the resource access request includes a first standard model of a first I/O device accessed by the user, and a transceiver unit configured to send the resource access request to the first I/O device based on the mapping configuration file.

In a possible implementation, the processing unit is further configured to perform object-oriented modeling on the various I/O devices in the vehicle for an application based on types of the various I/O devices accessed by the application, to generate the standard models of the various I/O devices, and perform physical port modeling for the I/O devices based on physical ports of the various I/O devices, and configure a conversion relationship between standardized data used to control the standard model and control data used to control the I/O device.

In a possible implementation, the resource access request further includes first standardized data used to control the first standard model.

The processing unit is further configured to convert, based on the conversion relationship, the first standardized data into first control data corresponding to the first I/O device.

The transceiver unit is further configured to send the first control data to the first I/O device.

In a possible implementation, the transceiver unit is further configured to receive sampled data reported by the first I/O device.

The processing unit is further configured to convert, based on the conversion relationship, the sampled data into second standardized data corresponding to the first standard model.

In a possible implementation, when the apparatus needs to access a second I/O device controlled by a second centralized controller, the resource access request includes a second standard model of the second I/O device accessed by the user, and the transceiver unit is further configured to send the resource access request to the second I/O device through a communication-layer link between the first centralized controller and the second centralized controller.

According to a third aspect, an embodiment of this disclosure provides an I/O device access apparatus, including a device abstraction layer configured to perform object-oriented modeling on various I/O devices in a vehicle, to generate standard models of the various I/O devices, and generate a mapping configuration file between the various I/O devices and the standard models, and an application layer configured to generate a resource access request based on an access operation of a user, and send the resource access request to the device abstraction layer, where the resource access request includes a first standard model of a first I/O device accessed by the user.

The device abstraction layer is further configured to send the resource access request to a communication layer.

The communication layer is configured to send a control command to a driver layer based on the resource access request by using a transceiver, to perform an input/output operation on the I/O device.

In a possible implementation, the driver layer is configured to send, in response to the control command, sampled data obtained through the input/output operation to the communication layer.

The communication layer is further configured to send the sampled data to the device abstraction layer.

The device abstraction layer is further configured to convert the sampled data into standardized data corresponding to the standard model, and send the standardized data to the application layer.

According to a fourth aspect, a computer-readable storage medium is provided, and is configured to store a computer program. The computer program includes instructions used to perform the method in any one of the first aspect or the possible implementations of the first aspect.

According to a fifth aspect, a computer program product is provided. The computer program product includes computer program code. When the computer program code is run on a computer, the computer is enabled to perform the method according to any one of the first aspect or the possible implementations of the first aspect.

BRIEF DESCRIPTION OF DRAWINGS

To describe technical solutions in some embodiments of this disclosure more clearly, the following describes the accompanying drawings for describing some of the embodiments of this disclosure.

DESCRIPTION OF EMBODIMENTS

The following describes embodiments of this disclosure with reference to the accompanying drawings in the embodiments of this disclosure.

Terms "include", "have", or any other variants thereof in the specification, claims, and accompanying drawings of this disclosure, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
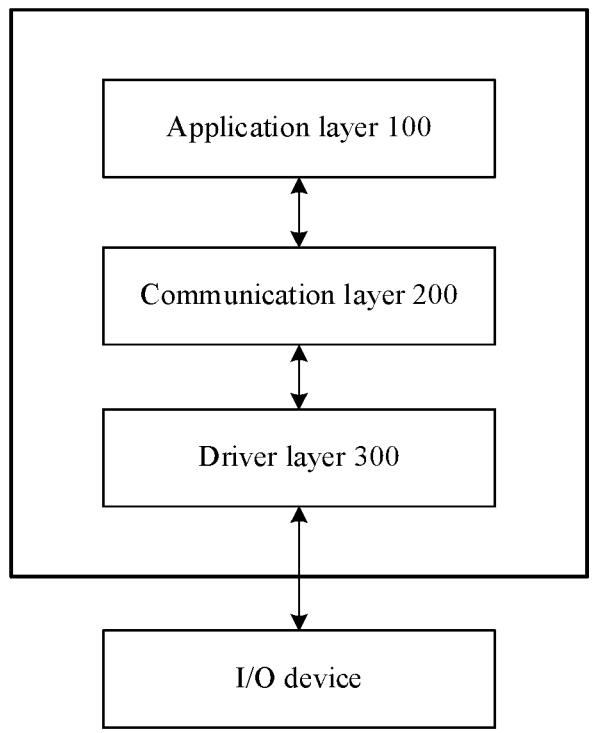
FIG. 1 is a schematic diagram of an existing software architecture for accessing an I/O device.

FIG. 1 is a schematic diagram of an existing software architecture for accessing an I/O device. The software architecture includes an application layer 100, a communication layer (com layer) 200, and a driver layer 300.

The application layer 100 is configured to store program code and run a related application for accessing an I/O device. For example, the applications may be some control applications for controlling an I/O device in a vehicle, or may be some applications for testing. When a user performs an operation for resource access to an I/O device, the application layer 100 may send a resource access request to the communication layer 200.

The communication layer 200 is configured to send the resource access request sent by the application layer 100 to the driver layer 300 by using a transceiver.

The driver layer 300 is configured to drive the related I/O device.

In this software architecture, when an I/O device needs to be accessed, details of inter-device communication such as the specific I/O device, an interface type, a vendor, and a vehicle model need to be indicated at the application layer 100. When any factor changes, an application at the application layer 100 also needs to be updated and adjusted. Consequently, flexibility and reliability are relatively poor. In addition, in this architecture, when an I/O device controlled by another centralized controller needs to be accessed in a cross-node manner, a communications interface for communication with the other centralized controller needs to be configured, and control code of the other centralized controller needs to be changed. Consequently, access efficiency is low.

In view of this, the embodiments of this disclosure provide an I/O device access method and apparatus, to improve flexibility and reliability of accessing and controlling an I/O device. The following describes in detail the I/O device access method and apparatus provided in the embodiments of this disclosure with reference to FIG. 2 to FIG. 9.

Figure 2:
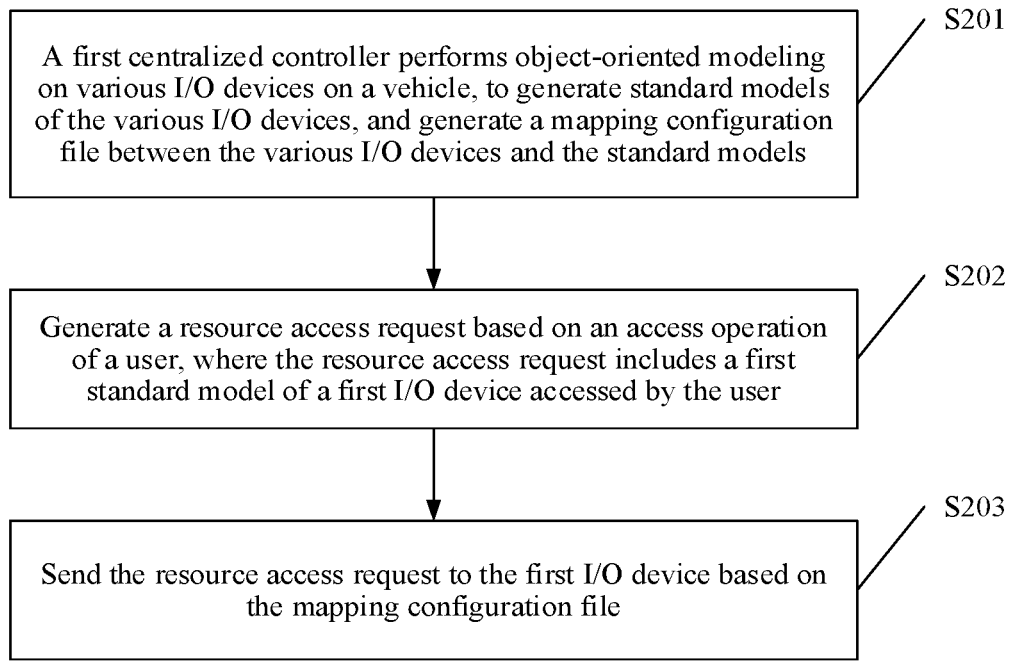
FIG. 2 is a schematic flowchart of an I/O device access method according to an embodiment of this disclosure.

FIG. 2 is a schematic flowchart of an I/O device access method according to an embodiment of this disclosure. The method includes the following steps.

S201: A first centralized controller performs object-oriented modeling on various I/O devices in a vehicle, to generate standard models of the various I/O devices, and generate a mapping configuration file between the various I/O devices and the standard models.

The various I/O devices in the vehicle may include various parts that can be accessed or controlled in the vehicle, such as a wiper, a window, a light, a seat, a door, a sunroof, and a trunk, and may further include various sensors, such as a distance sensor, a temperature sensor, a light sensor, a gravity sensor, and an acceleration sensor. In addition, the I/O device may be another electronic control unit (ECU) similar to the first centralized controller. For different vendors and vehicle models, I/O devices with different interfaces or model numbers may be used. When an application layer needs to access the I/O devices, adaptation needs to be performed based on different vendors, vehicle models, device model numbers, and interface types. Therefore, in this embodiment of this disclosure, object-oriented modeling may be performed on the various I/O devices, for example, on a wiper. When an application needs to access or control a wiper of any vendor, on a vehicle with any vehicle model, or with any model number or interface type, a resource access request can be made for such a standardized and object-oriented model of the "wiper".

S202: Generate a resource access request based on an access operation of a user, where the resource access request includes a first standard model of a first I/O device accessed by the user.

S203: Send the resource access request to the first I/O device based on the mapping configuration file.

The centralized controller generates the mapping configuration file between the various I/O devices and the standard models, so that the application can accurately deliver the resource access request to an I/O device that needs to be accessed or controlled to complete access or control.

In this embodiment of this disclosure, object-oriented modeling is performed on the various I/O devices, so that a single standard model can be mapped to a plurality of I/O devices with different model numbers or different interfaces. In addition, when accessing an I/O device, a centralized controller can send a resource access request for a standard model corresponding to the I/O device, can accurately send the resource access request to the I/O device based on the mapping configuration file to complete access to the I/O device, and does not need to perform adjustment based on different vendors, vehicle models, device model numbers, or interface types. Therefore, flexibility and reliability of accessing the I/O device are greatly improved.

Figure 3:
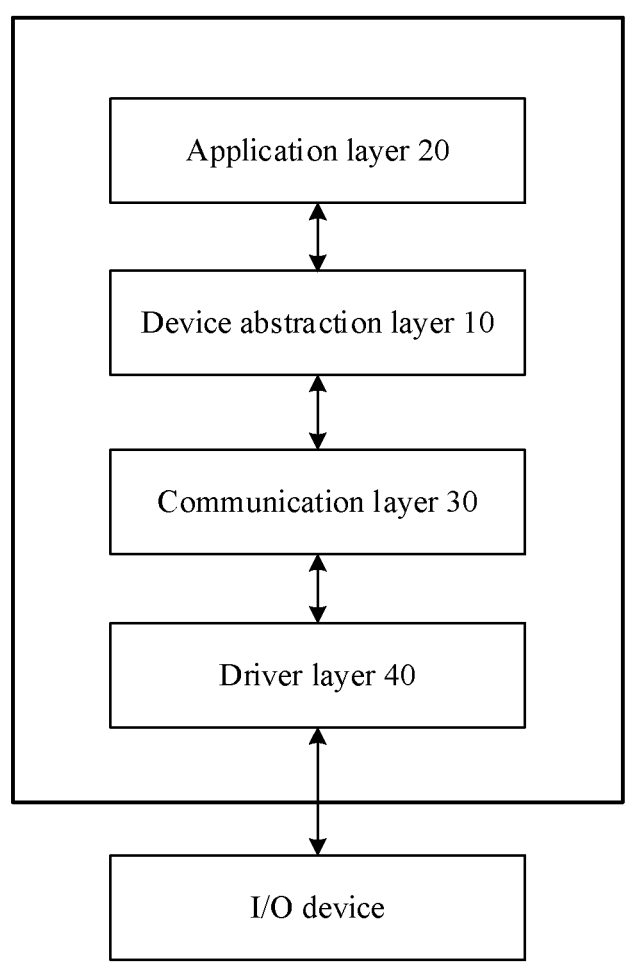
FIG. 3 is a schematic diagram of a software architecture for accessing an I/O device according to an embodiment of this disclosure.

FIG. 3 is a schematic diagram of a software architecture for accessing an I/O device according to an embodiment of this disclosure. The software architecture includes a device abstraction layer 10 configured to perform object-oriented modeling on various I/O devices in a vehicle, to generate standard models of the various I/O devices, and generate a mapping configuration file between the various I/O devices and the standard models, and an application layer 20 configured to generate a resource access request based on an access operation of a user, and send the resource access request to the device abstraction layer 10, where the resource access request includes a first standard model of a first I/O device accessed by the user.

The device abstraction layer 10 is further configured to send the resource access request to a communication layer 30.

The communication layer 30 is configured to send a control command to a driver layer 40 based on the resource access request by using a transceiver, to perform an input/output operation on the I/O device.

The driver layer 40 is configured to receive the resource access request forwarded by the transceiver, drive the I/O device, and complete the input/output operation.

Figure 4:
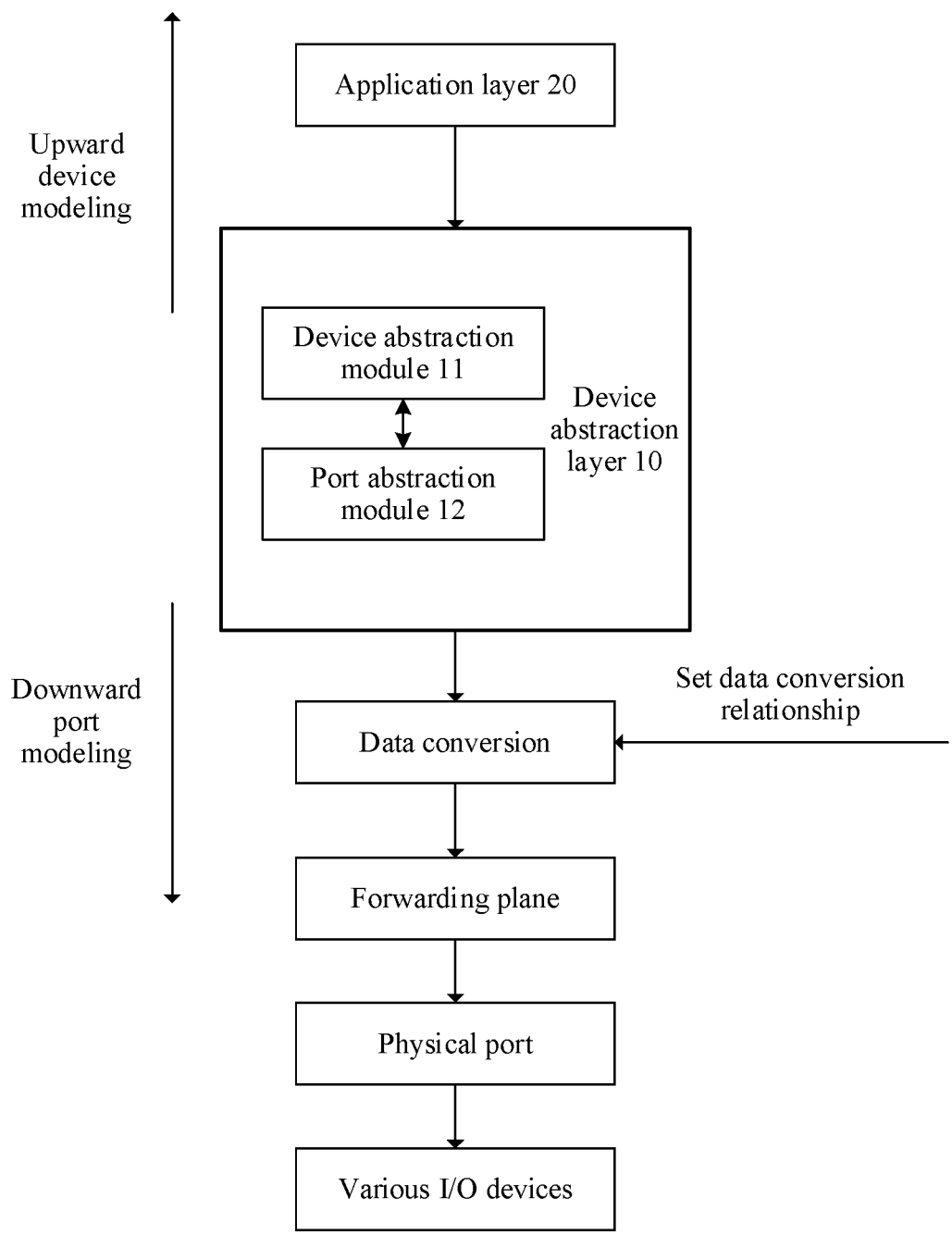
FIG. 4 is a schematic diagram of I/O device modeling and physical port modeling according to an embodiment of this disclosure.

FIG. 4 is a schematic diagram of I/O device modeling and physical port modeling according to an embodiment of this disclosure.

A device abstraction layer 10 may include a device abstraction module 11 and a port abstraction module 12. As shown in FIG. 4, the device abstraction module 11 may perform object-oriented modeling on various I/O devices in a vehicle for an application such as vehicle control unit (VCU) software or body control module (BCM) software based on types of the various I/O devices accessed by the application, to generate standard models of the various I/O devices. That is, device modeling is performed upward in an entire software architecture.

The port abstraction module 12 may perform physical port modeling for the I/O devices based on physical ports of the various I/O devices, and configure a conversion relationship between standardized data used to control the standard model and control data used to control the I/O device. That is, port modeling is performed downward in the entire software architecture. After data is converted, the data is forwarded through a forwarding plane. In other words, an I/O interface is converted to an Ethernet interface. Finally, the data is sent to the various I/O devices through the physical ports.

Upward modeling enables the application to access the I/O devices by accessing the standard models. Downward modeling enables the I/O devices with different interfaces to be mapped to a same physical port, and access to the I/O devices with different types of interfaces can be implemented through the physical port. When the I/O devices with different types of interfaces are accessed, corresponding conversion is performed on standardized data corresponding to a standard model and control data corresponding to a control device.

With reference to the I/O device access method described in FIG. 2, corresponding conversion may be performed on data delivered by the first centralized controller and data reported by the first I/O device.

When the first centralized controller needs to access the first I/O device, the resource access request further includes first standardized data used to control the first standard model.

The first centralized controller may convert, based on the conversion relationship, the first standardized data into first control data corresponding to the first I/O device, and send the first control data to the first I/O device.

When the first centralized controller indicates the first I/O device to report data or the first I/O device actively reports data, the first centralized controller may receive sampled data reported by the first I/O device, and convert, based on the conversion relationship, the sampled data into second standardized data corresponding to the first standard model.

For example, when a vendor, a vehicle model, a device model number, or an interface type needs to be changed, a corresponding design tool such as a management application may be used to change a temperature and/or a fitting formula used for an AD calibration configuration, change high and low thresholds and/or a calculation formula used for a PWM configuration, change high and low thresholds, high and low edge configurations and/or a calculation formula used for an output configuration, change a signal offset and/or a calculation formula used for a CAN database (DBC) configuration, and change a switch and/or high and low mapping used for a DI configuration. Then, when performing resource access to an I/O device, the port abstraction module 12 may perform, based on the completed configurations, calculation according to an AD fitting formula, conversion based on a PWM frequency ratio, DI high and low value mapping, CAN/LIN signal conversion, high-side and low-side driver value mapping, HB constant current value mapping, or Single Edge Nibble Transmission (SENT) bus mapping, to implement data conversion.

According to the method in this embodiment, a type of a physical port of an I/O device can be shielded, and an upper-layer application can be kept unchanged during development of different vehicle models. This reduces a development difficulty, improves a reuse degree of application-layer software, and facilitates vehicle research and development and testing. In addition, when a vendor, a vehicle model, a model number, or an interface changes, only configuration data needs to be updated. This is convenient for upgrade.

Figure 5:
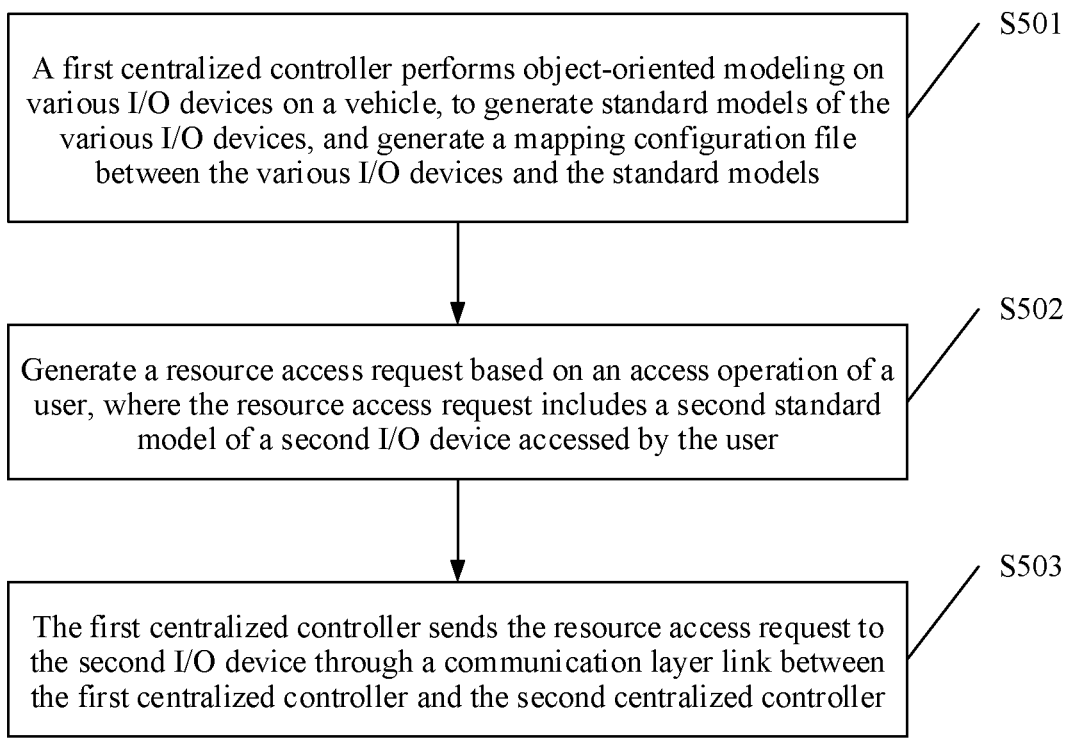
FIG. 5 is a schematic flowchart of another I/O device access method according to an embodiment of this disclosure.

Based on the method and architecture described in FIG. 2 to FIG. 4, an embodiment of this disclosure further provides a cross-node I/O device access method. FIG. 5 is a schematic flowchart of another I/O device access method according to this embodiment of this disclosure. The method includes the following steps.

S501: A first centralized controller performs object-oriented modeling on various I/O devices in a vehicle, to generate standard models of the various I/O devices, and generate a mapping configuration file between the various I/O devices and the standard models.

S502: Generate a resource access request based on an access operation of a user, where the resource access request includes a second standard model of a second I/O device accessed by the user.

S503: The first centralized controller sends the resource access request to the second I/O device through a communication-layer link between the first centralized controller and a second centralized controller.

Figure 6:
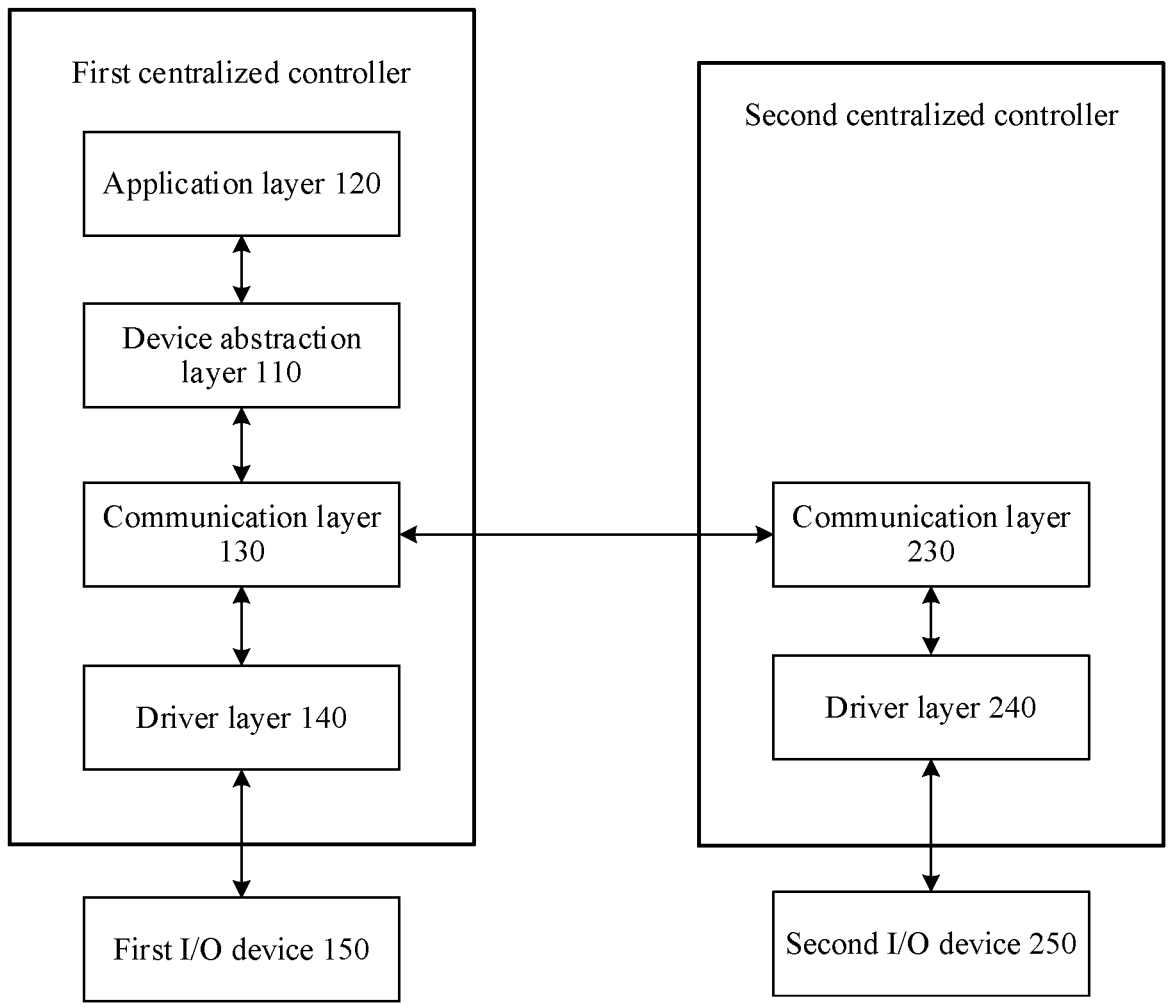
FIG. 6 is a schematic diagram of another software architecture for accessing an I/O device according to an embodiment of this disclosure.

For a schematic diagram of a software architecture corresponding to the method in FIG. 5, refer to FIG. 6. FIG. 6 is a schematic diagram of another software architecture for accessing an I/O device according to an embodiment of this disclosure. The software architecture includes a first centralized controller and a second centralized controller. The first centralized controller includes a device abstraction layer 110, an application layer 120, a communication layer 130, and a driver layer 140, and the second centralized controller includes a communication layer 230 and a driver layer 240.

It should be noted that the second centralized controller may also include a device abstraction layer and an application layer. However, in the cross-node I/O device access method in this embodiment of this disclosure, the application layer 220 does not need to be modified, and a new communications interface does not need to be added. This improves cross-node access efficiency and reduces cross-node access costs.

Based on the software architecture shown in FIG. 6, a specific I/O device access procedure may include local access to an I/O device and cross-node access to an I/O device.

A local access procedure (the first centralized controller accesses a first I/O device) is as follows.

The application layer 120 generates a resource access request and sends the resource access request to the device abstraction layer 110.

The device abstraction layer 110 sends the resource access request to the communication layer 130. In this step, the device abstraction layer 110 may convert first standardized data in the resource access request into control data corresponding to the first I/O device 150.

The communication layer 130 sends a corresponding control command to the driver layer 140 by using a transceiver, to perform an I/O operation on the first I/O device. As physical ports are different, the transceiver herein may be a general-purpose input/output (GPIO) transceiver, a CAN transceiver, or the like.

In response to the control command, the driver layer 140 accesses the first I/O device 150 and sends sampled data obtained through the I/O operation to the communication layer 130.

The communication layer 130 transfers the sampled data to the device abstraction layer 130.

The device abstraction layer 130 standardizes the access sampled data, that is, converts the sampled data into second standardized data corresponding to a first standard model, and then transfers the second standardized data to the application layer 120.

A cross-node access procedure (for example, the first centralized controller accesses a second I/O device) is as follows.

The application layer 120 generates a resource access request and sends the resource access request to the device abstraction layer 110.

The device abstraction layer 110 sends the resource access request to the communication layer 130. In this step, the device abstraction layer 110 may convert first standardized data in the resource access request into control data corresponding to the first I/O device 150.

The communication layer 130 sends the resource access request to the communication layer 230 of the second centralized controller.

The communication layer 230 of the second centralized controller sends a corresponding control command to perform an I/O operation on the second I/O device 250.

In response to the control command, the driver layer 240 of the second centralized controller accesses the second I/O device and transfers sampled data obtained through the I/O operation to the communication layer 230.

The communication layer 230 of the second centralized controller then transfers the sampled data to the communication layer 130 of the first centralized controller.

The communication layer 130 transfers the sampled data to the device abstraction layer 110.

The device abstraction layer 110 standardizes the sampled data, that is, converts the sampled data into standardized data corresponding to a second standard model, and then transfers the standardized data to the application layer 120.

Figure 7:
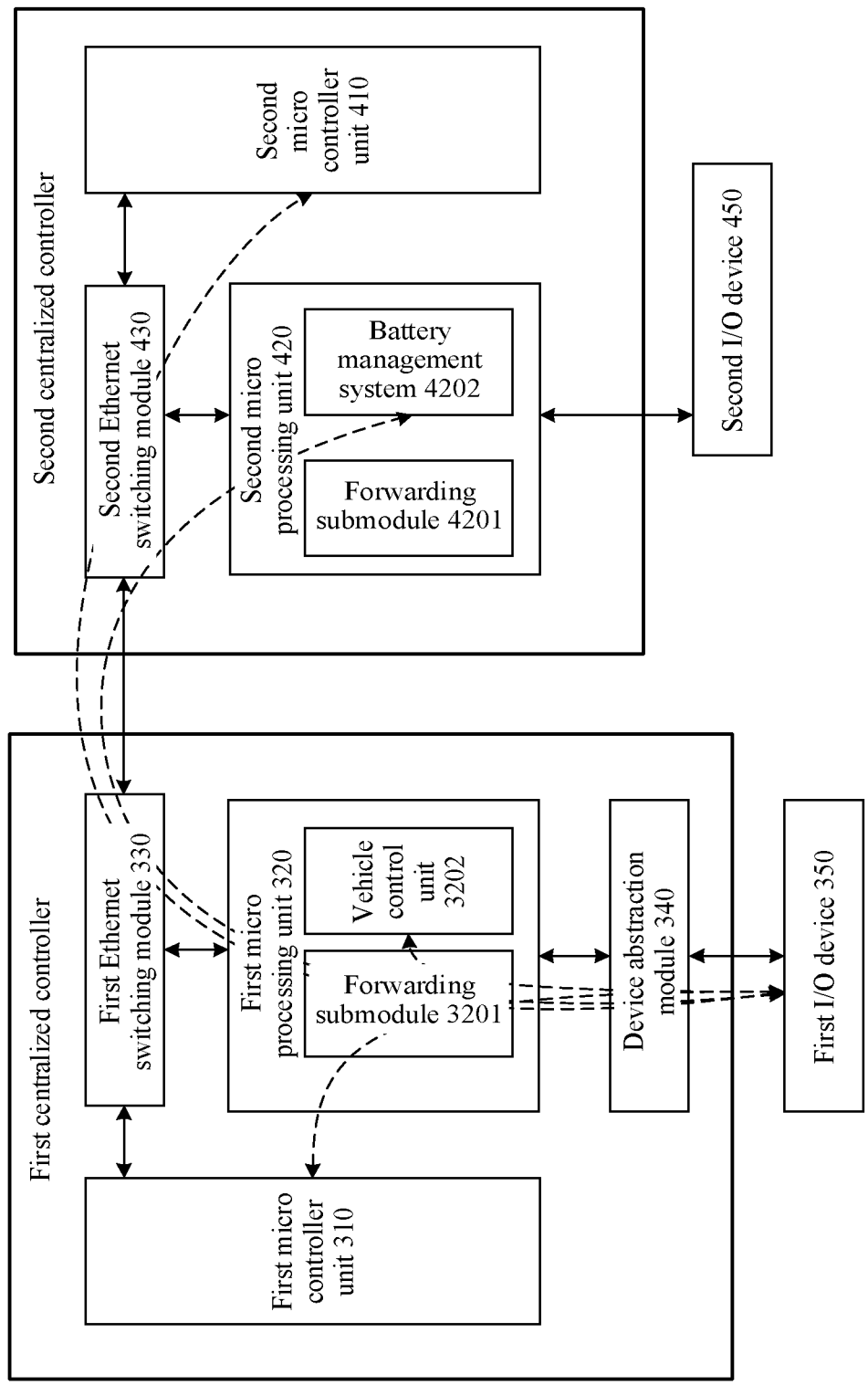
FIG. 7 is a schematic diagram of a hardware architecture for accessing an I/O device according to an embodiment of this disclosure.

For a hardware architecture corresponding to the foregoing software architecture, refer to FIG. 7. FIG. 7 is a schematic diagram of a hardware architecture for accessing an I/O device according to an embodiment of this disclosure. As shown in FIG. 7, an I/O device access apparatus includes a first centralized controller and a second centralized controller. The two centralized controllers are connected by using the Ethernet (ETH). The first centralized controller includes a first micro controller unit (MCU) 310, a first micro processing unit (MPU) 320, a first Ethernet switching module (Local Area Network (LAN) switch) 330, and a device abstraction module 340 (the device abstraction module 340 is a function module corresponding to a device abstraction layer, and may be disposed independently, or may be integrated with the first MCU 310 or the first MPU 320). The second centralized controller includes a second MPU 420, a second MCU 410, and a second Ethernet switching module 430 (and may or may not include a device abstraction module). An I/O device locally accessed by the first centralized controller is a first I/O device 350, and an I/O device locally accessed by the second centralized controller is a second I/O device 450.

The MCU may be deployed with an application with high real-time performance and a high security level, and may further be responsible for resource access and data forwarding for the I/O device. The MPU may be deployed with an application such as an advanced driver-assistance system (ADAS) having a high calculation amount requirement. The Ethernet switching module is used for backbone network communication.

For example, the first MPU 320 may be deployed with an autonomous driving related application function such as a pre-collision warning function, the first MCU 310 may be deployed with a VCU 3202 function, the second MPU 420 may be deployed with an ADAS function, and the second MCU 410 may be deployed with a battery management system (BMS) 4202 function.

As shown by a dashed arrow in FIG. 7, when the first I/O device 350 is locally accessed, data of the first I/O device 350 may be transferred to the first MPU 310/first MCU 320, or may be transferred to the second MPU 420/second MCU 410 of the second centralized controller through an Ethernet interface, to implement cross-node access by the second centralized controller to the first I/O device. Further, the second MPU 420 includes a forwarding submodule 4201 and the first MPU 320 includes a forwarding submodule 3201.

It should be noted that the method in this embodiment may be applied not only to resource access to a vehicle-mounted I/O device, but also to resource access to an industrial I/O device. This is not limited in this embodiment of this disclosure.

Figure 8:
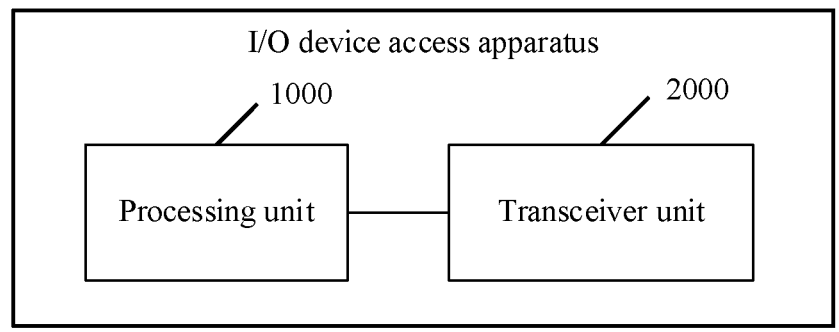
FIG. 8 is a schematic composition diagram of an I/O device access apparatus according to an embodiment of this disclosure.

FIG. 8 is a schematic composition diagram of an I/O device access apparatus according to an embodiment of this disclosure. The apparatus includes a processing unit 1000 configured to perform object-oriented modeling on various I/O devices in a vehicle, to generate standard models of the various I/O devices, and generate a mapping configuration file between the various I/O devices and the standard models, and generate a resource access request based on an access operation of a user, where the resource access request includes a first standard model of a first I/O device accessed by the user, and a transceiver unit 2000 configured to send the resource access request to the first I/O device based on the mapping configuration file.

Optionally, the processing unit 1000 is further configured to perform object-oriented modeling on the various I/O devices in the vehicle for an application based on types of the various I/O devices accessed by the application, to generate the standard models of the various I/O devices, and perform physical port modeling for the I/O devices based on physical ports of the various I/O devices, and configure a conversion relationship between standardized data used to control the standard model and control data used to control the I/O device.

Optionally, the resource access request further includes first standardized data used to control the first standard model.

The processing unit 1000 is further configured to convert, based on the conversion relationship, the first standardized data into first control data corresponding to the first I/O device.

The transceiver unit 2000 is further configured to send the first control data to the first I/O device.

Optionally, the transceiver unit 2000 is further configured to receive sampled data reported by the first I/O device.

The processing unit 1000 is further configured to convert, based on the conversion relationship, the sampled data into second standardized data corresponding to the first standard model.

Optionally, when the apparatus needs to access a second I/O device controlled by a second centralized controller, the resource access request includes a second standard model of the second I/O device accessed by the user, and the transceiver unit 2000 is further configured to send the resource access request to the second I/O device through a communication-layer link between the first centralized controller and the second centralized controller.

Figure 9:
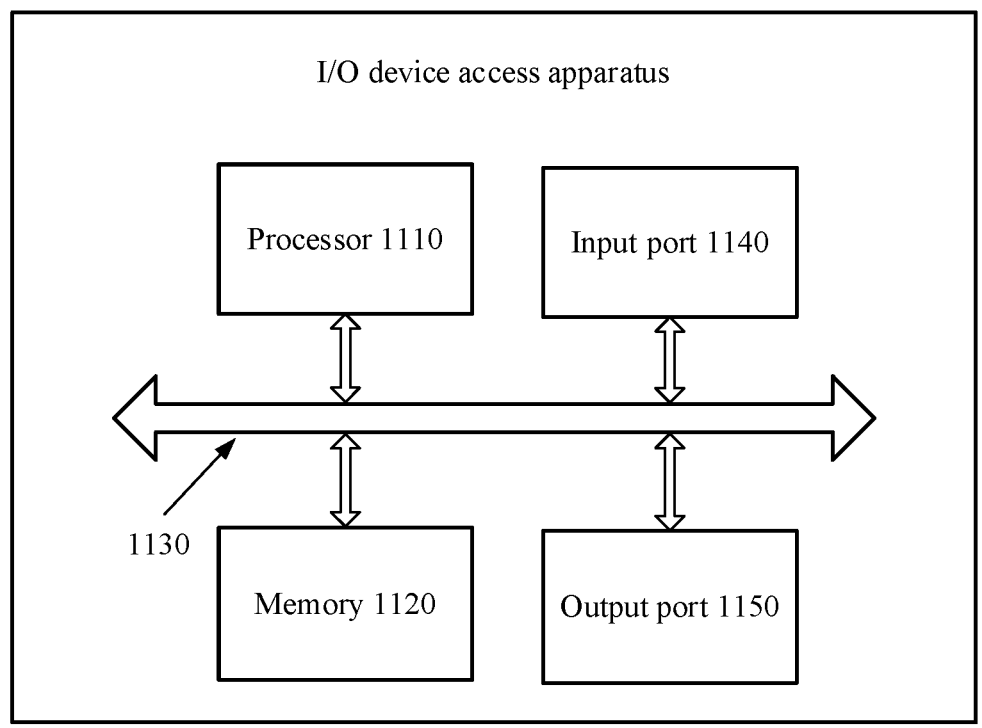
FIG. 9 is a schematic composition diagram of another I/O device access apparatus according to an embodiment of this disclosure.

FIG. 9 is a schematic composition diagram of another I/O device access apparatus according to an embodiment of this disclosure. As shown in FIG. 9, the apparatus may include a processor 1110, a memory 1120, an input port 1140, and an output port 1150. The processor 1110, the memory 1120, the input port 1140, and the output port 1150 are connected by using a bus 1130. The memory 1120 is configured to store instructions. The processor 1110 is configured to execute the instructions stored in the memory 1120, to implement steps performed by the first centralized controller in the methods corresponding to FIG. 2 to FIG. 6.

The processor 1110 is configured to execute the instructions stored in the memory 120, to control the input port 1140 and the output port 1150 to receive a signal or send a signal and complete the steps performed by the apparatus in the foregoing methods. The memory 1120 may be integrated into the processor 1110, or may be disposed independent of the processor 1110.

In an implementation, it may be considered that functions of the input port 1140 and the output port 1150 are implemented by using a transceiver circuit or a dedicated transceiver chip, and it may be considered that the processor 1110 is implemented by using a dedicated processing chip, a processing circuit, a processor, or a general-purpose chip.

In another implementation, it may be considered that the apparatus provided in this embodiment of this disclosure is implemented by using a general-purpose computer. That is, program code for implementing functions of the processor 1110 and the input port 1140 and the output port 1150 are stored in the memory 1120, and a general-purpose processor implements the functions of the processor 1110 and the input port 1140 and the output port 1150 by executing the code in the memory 1120.

For concepts, explanations, detailed descriptions, and other steps of the apparatus that are related to the technical solutions provided in this embodiment of this disclosure, refer to the descriptions of the content in the foregoing methods or other embodiments. Details are not described herein again.

In another form of this embodiment, a computer-readable storage medium is provided. The computer-readable storage medium stores instructions. The instructions are executed, to perform the method performed by the first centralized controller in the foregoing method embodiments.

In another form of this embodiment, a computer program product including instructions is provided. The instructions are executed, to perform the method performed by the first centralized controller in the foregoing method embodiments.

A person skilled in the art may understand that for ease of description, FIG. 9 shows only one memory and one processor. In an actual controller, there may be a plurality of processors and memories. The memory may also be referred to as a storage medium, a storage device, or the like. This is not limited in this embodiment of this disclosure.

It should be understood that, in this embodiment of this disclosure, the processor may be a central processing unit (CPU). The processor may further be another general-purpose processor, a digital signal processor (DSP), an application-specific integrated circuit (ASIC), a field-programmable gate array (FPGA) or another programmable logic device, a discrete gate or transistor logic device, a discrete hardware component, or the like.

It should be further understood that the memory mentioned in this embodiment of the present disclosure may be a volatile memory or a nonvolatile memory, or may include a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a random-access memory (RAM) and is used as an external cache. For example but not for limitative description, many forms of RAMs may be used, for example, static RAM (SRAM), a dynamic RAM (DRAM), a synchronous DRAM (SDRAM), a double data rate (DDR) SDRAM, an enhanced SDRAM (ESDRAM), a synchronous link DRAM (SLDRAM), and a direct Rambus (DR) RAM.

It should be noted that when the processor is a general-purpose processor, a DSP, an ASIC, an FPGA or another programmable logic device, a discrete gate or transistor logic device, or a discrete hardware component, the memory (storage module) is integrated into the processor.

It should be noted that the memory described in this specification aims to include but is not limited to these memories and any memory of another appropriate type.

The bus may further include a power bus, a control bus, a status signal bus, and the like, in addition to a data bus. However, for clear description, various buses in this figure are marked as the bus.

It should be further understood that "first", "second", "third", "fourth", and various numbers in this specification are merely used for differentiation for ease of description, and are not intended to limit the scope of this disclosure.

It should be understood that the term "and/or" in this specification describes only an association relationship between associated objects and represents that three relationships may exist. For example, A and/or B may represent the following three cases: only A exists, both A and B exist, and only B exists. In addition, the character "/" in this specification usually indicates an "or" relationship between associated objects.

In an implementation process, steps in the foregoing methods may be implemented by using an integrated logical circuit of hardware in the processor, or by using instructions in a form of software. The steps of the method disclosed with reference to the embodiments of this disclosure may be directly performed by a hardware processor, or may be performed by using a combination of hardware in the processor and a software module. The software module may be located in a mature storage medium in the art, such as a RAM, a flash memory, a ROM, a PROM, an EEPROM, a register, or the like. The storage medium is located in the memory, and the processor reads information in the memory and completes the steps in the foregoing methods in combination with the hardware in the processor. To avoid repetition, details are not described herein again.

According to the method provided in the embodiments of this disclosure, an embodiment of this disclosure further provides a system. The system includes the first centralized controller and the various I/O devices, and may further include the second centralized controller, and the like.

Sequence numbers of the foregoing processes do not mean execution sequences in the embodiments of this disclosure. The execution sequences of the processes should be determined based on functions and internal logic of the processes, and should not be constructed as any limitation on the implementation processes of the embodiments of this disclosure.

A person of ordinary skill in the art may be aware that various illustrative logical blocks (ILBs) and steps that are described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

In the several embodiments provided in this disclosure, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, function units in the embodiments of this disclosure may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive), or the like.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method implemented by a first centralized controller, wherein the method comprises:
   generating a resource access request when the first centralized controller accesses a first input/output (I/O) device of a plurality of I/O devices in a vehicle, wherein the resource access request comprises first standardized data for controlling a first standard model of a plurality of standard models of the I/O devices, and wherein when the first centralized controller needs to access a second I/O device of a second centralized controller, the resource access request further comprises a second standard model of the second I/O device;
   converting, based on a mapping configuration file between the I/O devices and the standard models, the first standardized data into first control data corresponding to the first I/O device;
   sending the first control data to the first I/O device;
   sending the resource access request to the second I/O device through a communication- layer link between the first centralized controller and the second centralized controller, wherein the resource access request further comprises second standardized data for controlling the second standard model;
   converting, based on the mapping configuration file, the second standardized data into second control data corresponding to the second I/O device; and
   sending the second control data to the second I/O device through the communication-layer link between the first centralized controller and the second centralized controller.

2. The method of claim 1, wherein the mapping configuration file comprises a conversion relationship between standardized data that controls the standard models and control data that controls the I/O devices.

3. The method of claim 1, further comprising:
   receiving sampled data from the first I/O device; and
   converting, based on the mapping configuration file, the sampled data into second standardized data corresponding to the first standard model.

4. The method of claim 1, further comprising performing object- oriented modeling on the I/O devices to generate the standard models.

5. The method of claim 1, further comprising implementing, by configuration, the mapping configuration file.

6. The method of claim 1, wherein the first I/O device belongs to the first centralized controller.

7. A first centralized controller for controlling access to a plurality of input/output (I/O) devices in a vehicle, wherein the first centralized controller comprises:
   one or more processors configured to:
      control standard models of the I/O devices and a mapping configuration file between the I/O devices and the standard models;
      generate a resource access request when the first centralized controller accesses a first I/O device of the I/O devices, wherein the resource access request comprises first standardized data for controlling a first standard model of the standard models, and wherein when the first centralized controller needs to access a second I/O device of a second centralized controller, the resource access request further comprises a second standard model of the second I/O device; and
      convert, based on the mapping configuration file, the first standardized data into first control data corresponding to the first I/O device; and one or more transceivers coupled to the one or more processors and configured to:
send the first control data to the first I/O device based on the mapping configuration file; and
send the resource access request to the second I/O device through a communication-layer link between the first centralized controller and the second centralized controller, wherein the resource access request comprises second standardized data for controlling the second standard model,
wherein the one or more processors are further configured to convert, based on the mapping configuration file, the second standardized data into second control data corresponding to the second I/O device, and
wherein the one or more transceivers are further configured to send the second control data to the second I/O device through the communication-layer link between the first centralized controller and the second centralized controller.

8. The first centralized controller of claim 7, wherein the mapping configuration file comprises a conversion relationship between standardized data that controls the standard models and control data that controls the I/O devices.

9. The first centralized controller of claim 7, wherein the one or more transceivers are further configured to:
receive sampled data from the first I/O device; and
convert, based on the mapping configuration file, the sampled data into second standardized data corresponding to the first standard model.

10. The first centralized controller of claim 7, wherein the one or more processors are further configured to perform object-oriented modeling on the I/O devices to generate the standard models.

11. The first centralized controller of claim 7, wherein the one or more processors are further configured to perform physical port modeling on the I/O devices based on physical ports of the I/O devices.

12. The first centralized controller of claim 7, wherein the one or more processors are further configured to implement, by configuration, the mapping configuration file.

13. The first centralized controller of claim 7, wherein the first I/O device belongs to the first centralized controller.

14. An apparatus for controlling access to a plurality of input/output (I/O) devices in a vehicle, wherein the apparatus comprises:
a device abstraction layer configured to control standard models of the I/O devices and a mapping configuration file between the I/O devices and the standard models;
a communication layer coupled to the device abstraction layer; and
an application layer coupled to the device abstraction layer and configured to generate a resource access request when the apparatus accesses a first I/O device of the I/O devices,
wherein the resource access request comprises first standardized data for controlling a first standard model of the standard models, wherein when the apparatus needs to access a second I/O device of another apparatus, the resource access request further comprises a second standard model of the second I/O device, and
wherein the device abstraction layer is further configured to:
convert, based on the mapping configuration file, the first standardized data into first control data corresponding to the first I/O device;
send the first control data to the first I/O device using the communication layer;
send the resource access request to the second I/O device through a communication-layer link between the apparatus and the other apparatus, wherein the resource access request further comprises second standardized data for controlling the second standard model;
convert, based on the mapping configuration file, the second standardized data into second control data corresponding to the second I/O device; and
send the second control data to the second I/O device through the communication-layer link between the first centralized controller and the second centralized controller.

15. The apparatus of claim 14, wherein the mapping configuration file comprises conversion relationships between standardized data that controls the standard models and control data that controls the I/O devices.

16. The apparatus of claim 14, wherein the device abstraction layer is further configured to:
receive sampled data from the communication layer; and
convert, based on the mapping configuration file, the sampled data into second standardized data corresponding to the first standard model.

17. The apparatus of claim 14, wherein the device abstraction layer is further configured to perform object-oriented modeling on the I/O devices to generate the standard models.

18. The apparatus of claim 14, wherein the device abstraction layer is further configured to perform physical port modeling on the I/O devices based on physical ports of the I/O devices.

19. The apparatus of claim 14, wherein the device abstraction layer is further configured to implement, by configuration, the mapping configuration file.

20. The apparatus of claim 14, wherein the first I/O device belongs to the first centralized controller.

* * * * *